July 1, 1930. R. A. HOPPE 1,769,784

PINWHEEL

Filed Sept. 21, 1928

INVENTOR
Robert A. Hoppe
BY
Osborne H. Gurney
ATTORNEY

Patented July 1, 1930

1,769,784

UNITED STATES PATENT OFFICE

ROBERT A. HOPPE, OF ROCHESTER, NEW YORK, ASSIGNOR TO BASTIAN BROS. COMPANY, OF ROCHESTER, NEW YORK

PINWHEEL

Application filed September 21, 1928. Serial No. 307,460.

The present invention relates to toys of the pinwheel type, an object thereof being to provide a pin wheel, or like wind driven member, which is so mounted as to both rotate and function as a motor in driving itself in a planetary movement about a circular orbit.

Another object of the invention is to provide a toy of the character described in which the wind driven member is mounted on a pivoted arm which is caused to swing about its axis by the action of the wind against the driven member.

Another and more specific object of the invention is to provide a holding stick on which is fixed a non-rotating spur gear with an arm pivoted at the center thereof and carrying a pinion engaging the gear teeth, a pin wheel or like wind driven member being mounted on the axis of the pinion and functioning as a motor in effecting rotation of the pinion in its planetary travel about the periphery of the fixed gear.

And, a further object of the invention is the provision of a pinwheel type of toy which is both novel and attractive, of simple construction and inexpensive to manufacture.

To these ends, the invention consists of certain parts and combinations of parts as will be fully set forth in the following description, and particularly defined in the appended claims.

The accompanying drawings illustrating the invention are as follows.

In the drawings similar reference numerals refer to similar parts throughout the several views.

Figure 1:
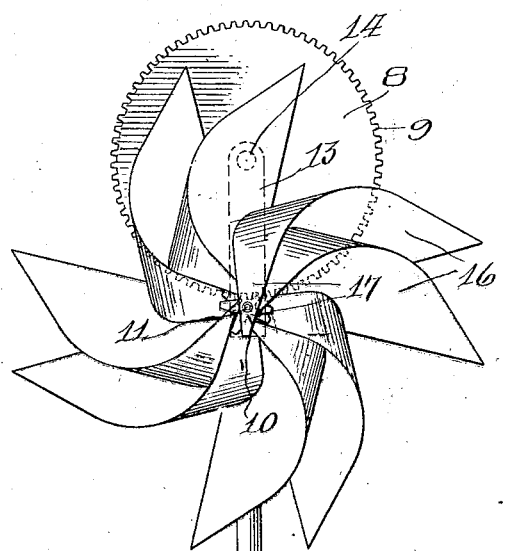
Fig. 1 is a front view of the device.
Figure 2:
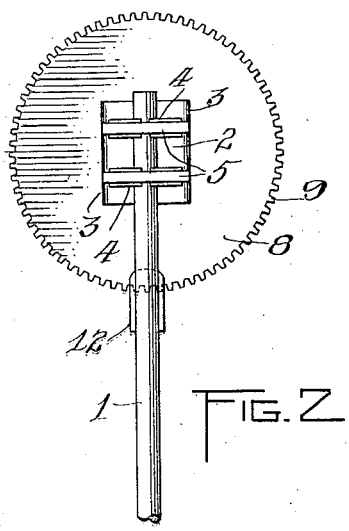
Fig. 2 is a rear view with the wind driven member removed.
Figure 3:
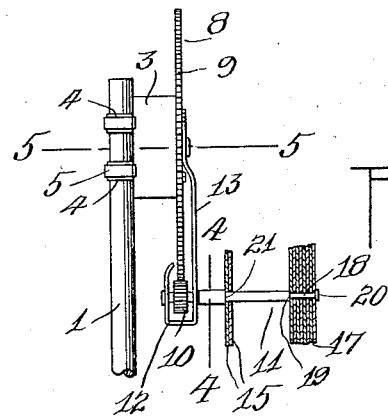
Fig. 3 is a side view with fragmentary portions only of the wind driven member being shown, and these in central vertical section.
Figure 4:
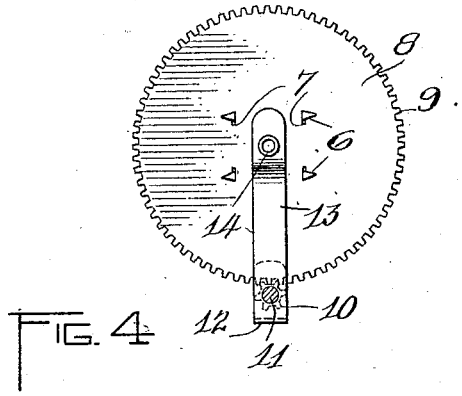
Fig. 4 is a sectional view on line 4—4, Fig. 3.
Figure 5:
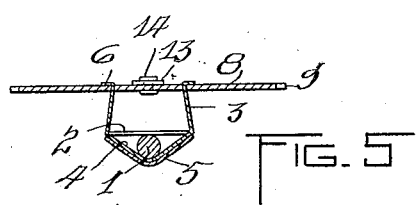
Fig. 5 is a sectional view on line 5—5, Fig. 3.

A handle comprising a stick 1 carries at its upper end a supporting member which, in this instance, is a rectangular piece of sheet material bent to form a bottom portion 2 lying against the side of the stick and laterally turned side walls 3, strips being cut in the bottom 2 and severed transversely to provide clips 4 which are bent outwardly to embrace the stick in the manner indicated and securely hold the supporting member thereon, these clips being bound together and reinforced by strips 5 soldered thereto. The edges of the side walls 3 are provided with prongs 6 which engage through perforations 7 in a comparatively thin disk 8 and are bent over against the outer face thereof as means for rigidly securing it to the supporting member.

This disk 8 has teeth 9 on its periphery and constitutes a non-rotatable fine tooth spur gear. Meshing with the gear teeth 9 is a pinion 10 fixed to the inner end of a shaft 11 mounted to rotate in the U-shaped outer end 12 of an arm 13, the inner end of which by an eyelet 14 is pivotally connected to the center of the disk 8. The end 12 of the arm 13 straddles the edge of the disk, thus holding the pinion against axial displacement and preventing the arm from being bent.

Any suitable wind-driven rotatable member may be mounted on the shaft 11. However, in the illustrated embodiment of the invention I have shown this member as a double pinwheel, that is, one formed in the usual manner but of two superimposed sheets 15 of non-metallic spring material, as celluloid, each sheet being but to form four vanes 16. The inwardly turned ends 17 of these vanes are held on the reduced outer end 18 of the shaft 11 between an outer shoulder 19 and the riveted end 20, while the back or body of the wheel seats against an inner shoulder 21. Thus, the resiliency of the blades together with the tight fit of the ends 17 between the shoulder 19 and the head 20 bind the wheel to the shaft.

From the foregoing it will be observed that the pinwheel, or wind driven member, has two distinct motions, one being a rotation about its axis and the other a planetary motion around the periphery of the disk 8 through the means of a pinion mounted on an arm pivoted axially of the disk, the pinion and the pinwheel being fixed to a common shaft with the pinwheel functioning as a motor for driving the pinion.

What I claim is:

1. In an article of the character described, a non-rotatable disk having a toothed periphery, an arm carried by and pivoted axially of said disk, a shaft mounted to rotate in said arm, a pinion fixed to said shaft and meshing with the teeth of said disk, and a wind-driven member fixed to said shaft and lying in a plane parallel to the disk.

2. An article of the character described including a handle, a disk of sheet material comprising a spur gear, a support carried by said handle and to which said disk is secured against rotation, an arm movable over the face of said disk and pivoted axially thereof, the outer end of said arm being U-shape and straddling said gear to hold the arm against lateral displacement, a shaft mounted in the U-shaped end of said arm, a pinion fixed to said shaft and meshing with the teeth of said gear, and a wind-driven member on said shaft as a driving means therefor.

3. A combination in accordance with claim 2 characterized by said support being of sheet material and including a bottom, side walls, means for attaching said walls and said disk together, and fastening means bent outwardly from the bottom of said support to secure the latter to said handle.

4. In an article of the character described, two members rotatable about parallel axes, one being wind-driven and the other a carrying member, a support for the carrying member, said carrying member being pivoted at one end to said support and carrying the wind-driven member at its other end adjacent said support, and a driving connection between the wind-driven member and said support whereby the wind-driven member revolves about the axis of said carrying member.

ROBERT A. HOPPE.